United States Patent [19]
Muller et al.

[11] 3,916,724
[45] Nov. 4, 1975

[54] VENTING APPARATUS FOR A TRANSMISSION

[75] Inventors: Hans Joachim Müller, Neufahrn, near Freising; Gerhard Sendner, Munich, both of Germany

[73] Assignee: Buro Patent AG, Glarus, Switzerland

[22] Filed: Oct. 9, 1973

[21] Appl. No.: 404,649

[30] Foreign Application Priority Data
Oct. 10, 1972  Sweden .................. 14755

[52] U.S. Cl. ............. 74/606 R; 137/589; 137/592; 184/1 R; 220/44 R
[51] Int. Cl.² ........................ F16H 57/02
[58] Field of Search ...... 184/1 R; 74/606 R, 606 A; 220/44 R, 44 A, DIG. 27; 137/587, 588, 592, 589

[56] References Cited
UNITED STATES PATENTS

| | | |
|---|---|---|
| 2,738,796 | 3/1956 | Chadwick .................. 137/587 X |
| 3,145,582 | 8/1964 | Wagner .................. 74/606 |
| 3,205,923 | 9/1965 | Wilson .................. 137/588 X |
| 3,308,681 | 3/1967 | Huber .................. 184/1 R X |
| 3,314,306 | 4/1967 | Barclae .................. 74/606 |
| 3,343,710 | 9/1967 | Wehle et al. .................. 220/44 A |

Primary Examiner—Charles J. Myhre
Assistant Examiner—Daniel J. O'Connor
Attorney, Agent, or Firm—Werner W. Kleeman

[57] ABSTRACT

A venting apparatus for a transmission with a venting channel which communicates an internal compartment of the transmission housing which is located above the level of the lubricant with the outside. The venting channel is arranged in a tubular-shaped probe which extends such an extent into the transmission housing that its end, which is provided with a drip or drain flange, in each position of the transmission is located above the lubricant level.

6 Claims, 1 Drawing Figure

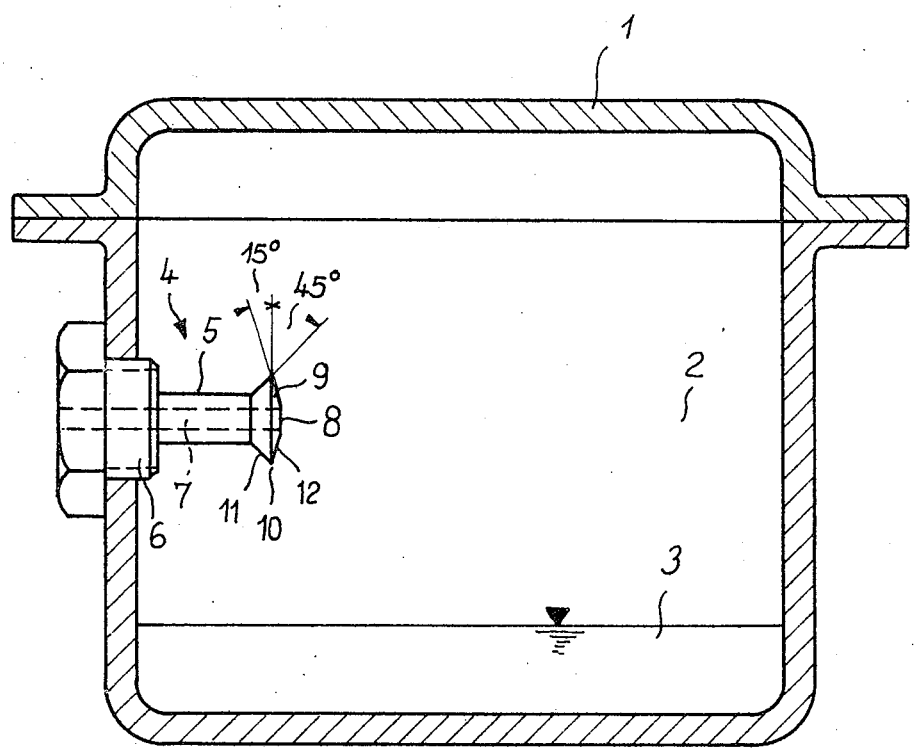

VENTING APPARATUS FOR A TRANSMISSION

BACKGROUND OF THE INVENTION

The present invention relates to a new and improved construction of venting apparatus for a transmission or gearing incorporating a venting or vent channel which communicates with the surroundings or outside an internal compartment or space of the transmission housing which is located above the level of the lubricant.

There are known to the art an entire series of venting devices for transmissions or gearings, for instance as exemplified by U.S. Pat. No. 2,329,078 and British Pat. Nos. 894,546 and 1,181,125, which establish a communication between the internal space of the transmission housing or gearbox and the surroundings. They serve the purpose of preventing the build-up of an overpressure in the transmission during heating an expansion of the air within the transmission. The venting devices of the prior art run the gamut between simple venting chanels up to complicated labyrinth arrangements. However, a common feature associated with the various venting devices of the prior art resides in the fact that they are not satisfactory for use with transmissions which are subjected to marked changes in position, since when the transmission assumes an unfavorable position there cannot be prevented the escape of lubricant.

SUMMARY OF THE INVENTION

Hence it is a primary object of the present invention to provide an improved construction of venting apparatus for a transmission which is not associated with the aforementioned drawbacks and limitations of the prior art proposals.

Another and more specific object of the present invention relates to a new and improved construction of venting apparatus for a transmission which also then prevents the escape of lubricant when the transmission experiences a pronounced change in position, such as for instance side positioning or inversion thereof.

Now in order to implement these and still further objects of the invention, which will become more readily apparent as the description proceeds, the previously mentioned venting channel of the transmission of this development is arranged in a tubular-shaped probe which extends such an extent into the transmission housing that its end, which is equipped with a drain or drip flange, in each position of the transmission is located above the level of the lubricant.

Since the vent or venting channel is arranged in a tubular-shaped probe which extends such an extent into the transmission housing that its end is located above the momentary level of the lubricant throughout each position of the transmission, there is prevented that with a change in the position of the transmission lubricant can directly enter into the opening of the vent channel. The drip or drain flange at the opening of the vent channel furthermore insures that lubricant which flows along the probe or is sprayed against such probe will be directed away before it can arrive at the opening of the vent channel. Consequently, it is practically impossible that lubricant will escape through the vent channel to the outside of the transmission.

BRIEF DESCRIPTION OF THE DRAWING

The invention will be better understood and objects other than those set forth above, will become apparent when consideration is given to the following detailed description thereof. Such description makes reference to the annexed drawing wherein the single figure shows in vertical sectional view an exemplary embodiment of the venting apparatus at a transmission.

DETAILED DESCRIPTION OF THE PREFERRED EMBODIMENTS

Referring now to the drawing, it is to be understood that to preserve clarity in the illustration of the vertical sectional view of the transmission depicted in the drawing, components of the transmission have been conveniently omitted and only those parts of the transmission housing equipped with the vent apparatus have been schematically shown so that the underlying concepts of the invention will be completely clear to those skilled in the art. The transmission housing 2 which possesses a cover member or cover 1 is filled with lubricant 3 up to the depicted level. At the side of the housing above the level of the lubricant there is arranged a vent or venting apparatus 4. Such vent apparatus or device 4 contains a probe 5 which is threadably connected via a threaded socket or screw base 6 into a threaded opening of the transmission housing 2. The tubular-shaped probe 5 possesses a vent or venting channel 7 which communicates the internal space of the transmission above the lubricant level with the surroundings. The inner end of the probe 5 is located to such an extent at the interior of the transmission housing that, for instance, with the transmission located at its side the probe 5 protrudes through the lubricant into the interior of the housing 2. At the inner end of the probe 5 there is arranged a drain or drip flange 9 which extends about the opening 8 of the vent or venting channel 7. This drain or drip flange 9 is constructed in a knife-edge like manner along its periphery 10. The end face 11 of the flange 9 which faces away from the end of the probe is arranged at an inclination with respect to the plane of the flange in order to favorably influence the draining-off or removal of the lubricant. An angle of inclination of 45° is particularly advantageous. The end face 12 which confronts the end of the probe 5 is likewise inclined with respect to the plane of the flange, and in this regard it has been found to be particularly advantageous to provide an angle of inclination of 15°.

While there is shown and described present preferred embodiments of the invention, it is to be distinctly understood that the invention is not limited thereto, but may be otherwise variously embodied and practiced within the scope of the following claims. Accordingly,

What is claimed is:

1. The combination with a transmission incorporating a transmission housing containing lubricant of a vent apparatus communicating with said transmission housing, said transmission housing including an internal compartment located above the level of the lubricant therein, said vent apparatus comprising a tubular-shaped probe having arranged therein a vent channel continuously communicating said internal compartment with the atmosphere, said tubular-shaped probe having an end equipped with a drip flange and extending such an extent into the transmission housing that said end equipped with said drip flange is located above the level of the lubricant in all positions of the transmission.

2. The combination as defined in claim 1, wherein the drip flange possesses a knife-edge like construction along its periphery.

3. The combination as defined in claim 1, wherein the drip flange is inclined with respect to the plane of the flange at an end face facing away from the end of the probe.

4. The combination as defined in claim 3, wherein the angle of inclination of the drip flange amounts to about 45°.

5. The combination as defined in claim 1, wherein an end face of the flange which is located at the end of the probe is inclined with respect to the plane of the flange.

6. The combination as defined in claim 5, wherein said end face of the flange is inclined with respect to the plane of the probe at an angle of about 15°.

* * * * *